(12) United States Patent
Sakazaki et al.

(10) Patent No.: US 10,557,502 B2
(45) Date of Patent: Feb. 11, 2020

(54) ROLLING BEARING DEVICE AND OIL SUPPLY UNIT

(71) Applicant: JTEKT CORPORATION, Osaka-shi, Osaka (JP)

(72) Inventors: Tsukasa Sakazaki, Kizugawa (JP); Yusuke Ueda, Yondabayashi (JP); Yoshimichi Higashiyama, Kashihara (JP)

(73) Assignee: JKTEKT CORPORATION, Osaka-shi (JP)

( * ) Notice: Subject to any disclaimer, the term of this patent is extended or adjusted under 35 U.S.C. 154(b) by 0 days.

(21) Appl. No.: 16/155,306

(22) Filed: Oct. 9, 2018

(65) Prior Publication Data

US 2019/0113079 A1    Apr. 18, 2019

(30) Foreign Application Priority Data

Oct. 16, 2017 (JP) ................. 2017-200428

(51) Int. Cl.
| | |
|---|---|
| *F16C 33/66* | (2006.01) |
| *F16C 19/06* | (2006.01) |
| *F16N 7/38* | (2006.01) |
| *F16N 9/02* | (2006.01) |
| *F16N 13/00* | (2006.01) |

(52) U.S. Cl.
CPC .......... *F16C 33/6674* (2013.01); *F16C 19/06* (2013.01); *F16N 7/38* (2013.01); *F16N 9/02* (2013.01); *F16N 13/00* (2013.01)

(58) Field of Classification Search
CPC ........ F16C 19/06; F16C 33/6674; F16N 7/38; F16N 9/02; F16N 13/00
See application file for complete search history.

(56) References Cited

U.S. PATENT DOCUMENTS

| | | | |
|---|---|---|---|
| 10,385,844 B2* | 8/2019 | Naka ................. | F04B 17/03 |
| 2016/0025141 A1* | 1/2016 | Tanimoto ............ | F16C 33/6651 384/473 |
| 2017/0288120 A1* | 10/2017 | Higashiyama ...... | F16C 33/6659 |
| 2017/0328410 A1* | 11/2017 | Tanimoto ................ | F16C 19/06 |

FOREIGN PATENT DOCUMENTS

JP    2017-026157 A    2/2017

* cited by examiner

*Primary Examiner* — Alan B Waits
(74) *Attorney, Agent, or Firm* — Oliff PLC

(57) ABSTRACT

An oil supply unit has: a pump that has a pressure chamber portion that stores lubricating oil and a piezoelectric element that is deformable by application of a voltage, the pump ejecting lubricating oil in the pressure chamber portion; a tank that is connected to the pump and that stores lubricating oil to be supplied to the pump for replenishment; a sensor that detects a pressure in an oil region which extends from the pressure chamber portion to the tank and in which lubricating oil is present, or the state of a bearing portion; a pressure adjustment portion that adjusts a pressure of lubricating oil in the oil region which extends from the pressure chamber portion to the tank; and a control portion that controls at least one of the pressure adjustment portion and the piezoelectric element on the basis of a detection result from the sensor.

11 Claims, 6 Drawing Sheets

ROLLING BEARING DEVICE AND OIL SUPPLY UNIT

INCORPORATION BY REFERENCE

The disclosure of Japanese Patent Application No. 2017-200428 filed on Oct. 16, 2017 including the specification, drawings and abstract, is incorporated herein by reference in its entirety.

BACKGROUND OF THE INVENTION

1. Field of the Invention

The present invention relates to a rolling bearing device and an oil supply unit.

2. Description of the Related Art

In recent years, various types of machine tools are requested to increase the speed of a main spindle in order to improve the processing efficiency and the production efficiency. When the main spindle is rotated at a high speed, the lubricating property of a bearing portion that supports the main spindle is particularly important. Thus, there is proposed a rolling bearing device in which an oil supply unit is provided adjacent to a bearing portion in the axial direction (see Japanese Patent Application Publication No. 2017-26157 (JP 2017-26157 A)). The oil supply unit has a pump or the like in order to supply lubricating oil to the bearing portion.

The pump of the oil supply unit described above causes lubricating oil to be ejected from an ejection port as oil droplets to be supplied to the bearing portion. To this end, the pump has a pressure chamber portion that stores lubricating oil and a piezoelectric element that is deformable by application of a voltage to vary the volume of the pressure chamber portion. The volume of the pressure chamber portion is reduced through deformation operation of the piezoelectric element, which allows ejection of lubricating oil.

With the oil supply unit which includes such a pump, however, supply of lubricating oil (oil supply) occasionally becomes unstable. For example, if a minute quantity of air intrudes into the pressure chamber portion, a prescribed discharge pressure (ejection pressure) may not be obtained because of the effect of the air, even if the piezoelectric element varies the volume of the pressure chamber portion, which may vary the ejection speed of oil droplets to make oil supply unstable. A tank is connected to the pump in order to supply lubricating oil for replenishment. When the pressure of lubricating oil on the tank side is particularly high, the lubricating oil may seep from the ejection port, even if the piezoelectric element is not deformed. When the seeping lubricating oil blocks the ejection port, subsequent ejection of oil droplets may be adversely affected. When the pressure of lubricating oil on the tank side is particularly low, on the contrary, a desired discharge pressure may not be obtained and lubricating oil may not be ejected as oil droplets, even if the piezoelectric element is deformed. If a state in which oil supply by the pump is unstable as described above continues, the bearing portion may soon be brought into a poor lubrication state to lower the rotation performance of the bearing portion.

SUMMARY OF THE INVENTION

It is an object of the present invention to provide a rolling bearing device that includes an oil supply unit that makes it possible to resolve a state in which oil supply by a pump is unstable, and such an oil supply unit.

An aspect of the present invention provides a rolling bearing device including: a bearing portion that has an inner ring, an outer ring, and a plurality of rolling elements provided between the inner ring and the outer ring; and an oil supply unit provided adjacent to the bearing portion and configured to supply lubricating oil to the bearing portion, in which the oil supply unit has: a pump that has a pressure chamber portion that stores lubricating oil and a piezoelectric element that is deformable by application of a voltage to vary a volume of the pressure chamber portion, the pump ejecting lubricating oil in the pressure chamber portion as the volume is reduced; a tank that is connected to the pump and that stores lubricating oil to be supplied to the pump for replenishment; a sensor that detects a pressure in an oil region which extends from the pressure chamber portion to the tank and in which lubricating oil is present, or a state of the bearing portion; a pressure adjustment portion that adjusts a pressure of lubricating oil in the oil region which extends from the pressure chamber portion to the tank and in which lubricating oil is present; and a control portion that controls at least one of the pressure adjustment portion and the piezoelectric element on the basis of a detection result from the sensor.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
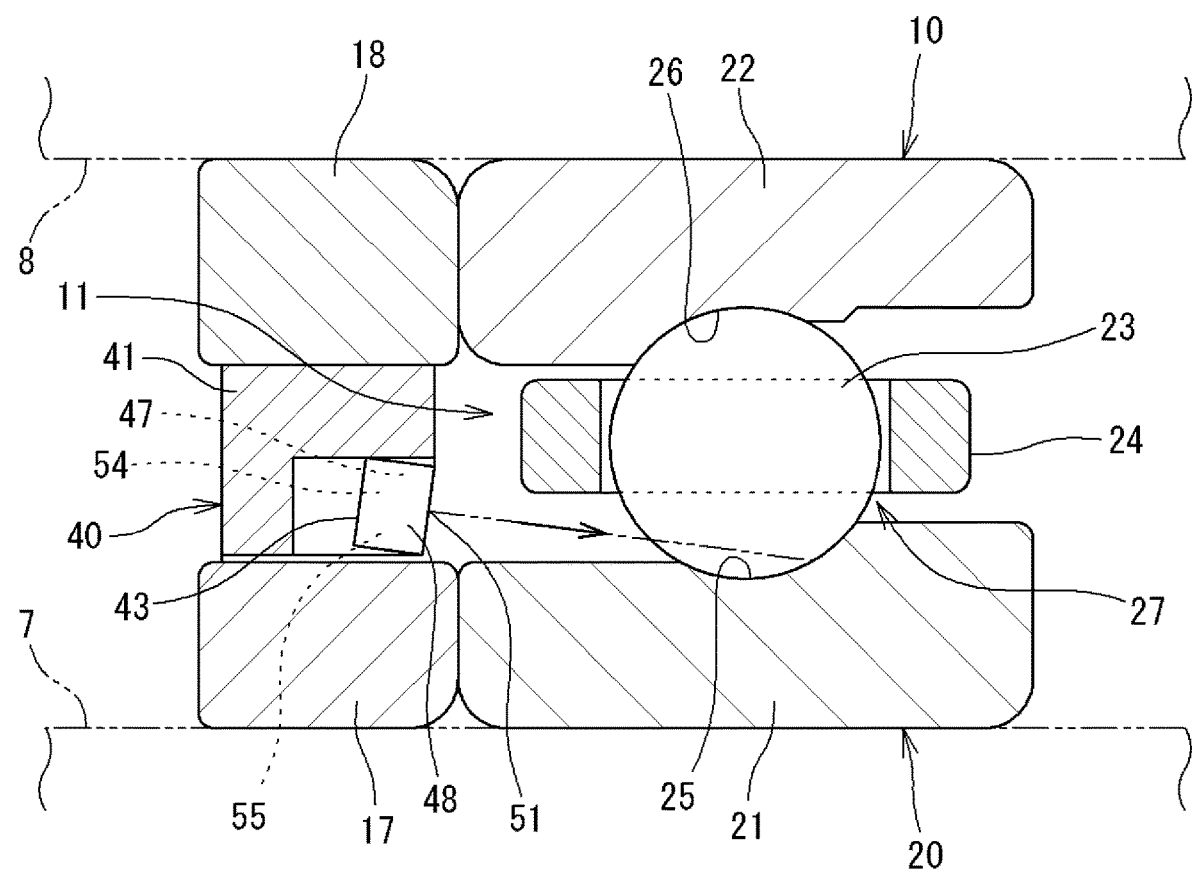
FIG. 1 is a sectional view illustrating an example of a rolling bearing device.

FIG. 1 is a sectional view illustrating an example of a rolling bearing device. A rolling bearing device 10 (hereinafter referred to also as a "bearing device 10") illustrated in FIG. 1 supports a shaft (main spindle) 7 of a main spindle device of a machine tool so that the shaft 7 is rotatable, and is housed in a bearing housing 8 of the main spindle device. In FIG. 1, the shaft 7 and the bearing housing 8 are indicated by the long dashed double-short dashed lines. The rolling bearing device 10 according to the present invention is also applicable to devices other than machine tools. In the following description, a direction that is parallel to a central axis C of the bearing device 10 is referred to as an "axial direction", and a direction that is orthogonal to the axial direction is referred to as a "radial direction".

The bearing device 10 illustrated in FIG. 1 includes a bearing portion 20 and an oil supply unit 40. The bearing portion 20 has an inner ring 21, an outer ring 22, a plurality of balls (rolling elements) 23, and a cage 24 that holds the plurality of balls 23, and constitutes a ball bearing (rolling bearing). The bearing device 10 further includes an inner ring spacer 17 in a cylindrical shape and an outer ring spacer 18 in a cylindrical shape.

The oil supply unit 40 is in a circular ring shape as a whole, and is provided adjacent to the bearing portion 20 in the axial direction. The oil supply unit 40 according to the present embodiment is provided on the radially inner side of the outer ring spacer 18, and positioned adjacent, in the axial direction, to an annular space 11 formed between the inner ring 21 and the outer ring 22. The bearing portion 20 (annular space 11) has a function of supplying lubricating oil. The configuration and the function of the oil supply unit 40 will be described later. Although not illustrated, the oil supply unit 40 (body portion 41 to be discussed later) and the outer ring spacer 18 may be integrated with each other so that the oil supply unit 40 functions as an outer ring spacer.

In the present embodiment, the outer ring 22 and the outer ring spacer 18 are attached to the bearing housing 8 so as not to be rotatable, and the inner ring 21 and the inner ring spacer 17 are rotatable together with the shaft 7. Thus, the outer ring 22 serves as a stationary ring that is not rotatable, and the inner ring 21 serves as a rotary ring that is rotatable together with the shaft 7.

The inner ring 21 is a cylindrical member externally fitted with the shaft 7. A raceway 25 (hereinafter referred to as an "inner ring raceway 25") is formed on the outer periphery of the inner ring 21. In the present embodiment, the inner ring 21 and the inner ring spacer 17 are separate from each other. However, the inner ring 21 and the inner ring spacer 17 may be (inseparably) integral with each other, although not illustrated. The outer ring 22 is a cylindrical member attached to the inner peripheral surface of the bearing housing 8. A raceway 26 (hereinafter referred to as an "outer ring raceway 26") is formed on the inner periphery of the outer ring 22. In the present embodiment, the outer ring 22 and the outer ring spacer 18 are separate from each other. However, the outer ring 22 and the outer ring spacer 18 may be (inseparably) integral with each other, although not illustrated.

The balls 23 are interposed between the inner ring 21 and the outer ring 22, and rolled on the inner ring raceway 25 and the outer ring raceway 26. The cage 24 has an annular shape, and is formed with a plurality of pockets 27 that house the balls 23 along the circumferential direction. The balls 23 and the cage 24 are provided in the annular space 11.

Figure 2:
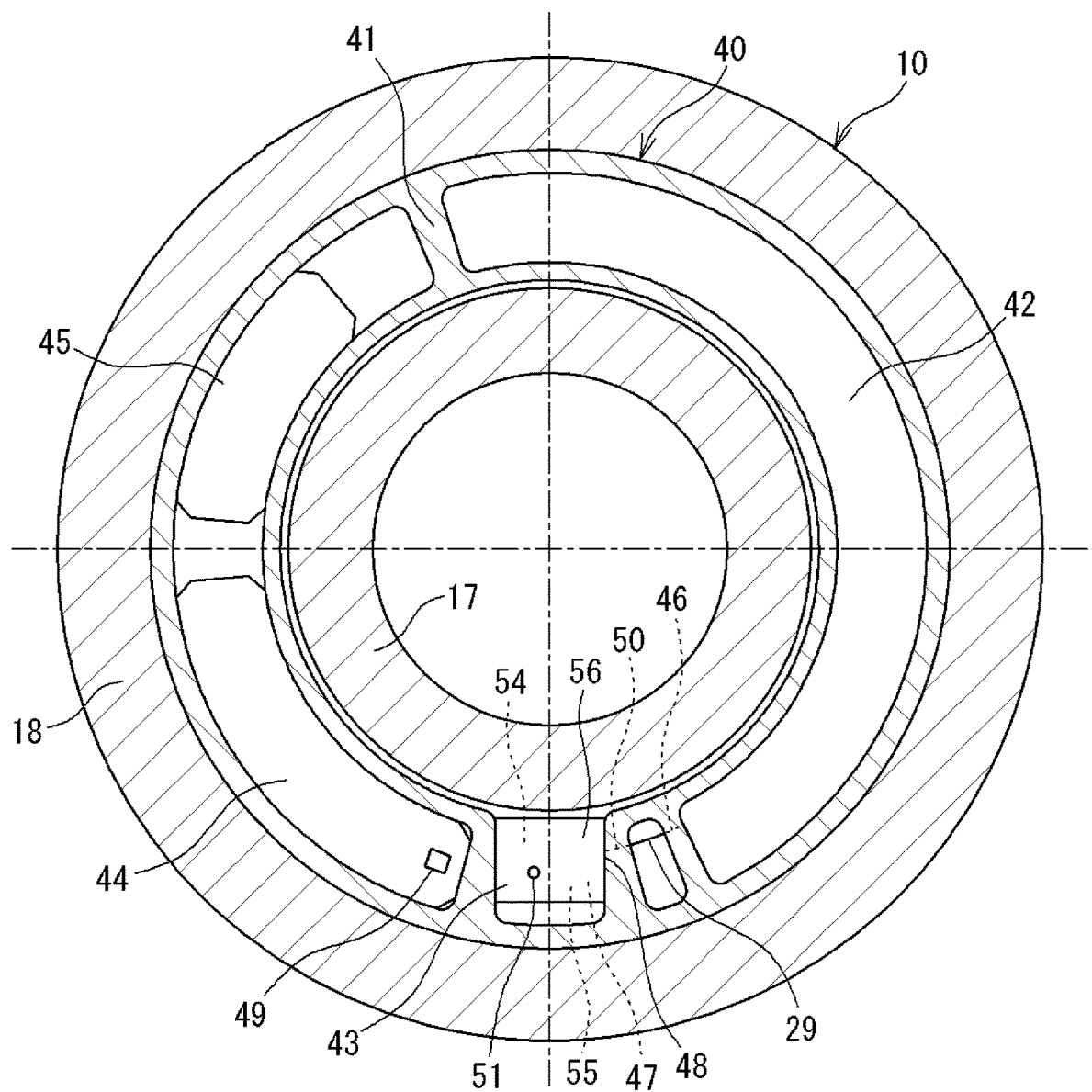
FIG. 2 illustrates an oil supply unit as seen in the axial direction.

FIG. 2 illustrates the oil supply unit 40 as seen in the axial direction. The oil supply unit 40 has a circular ring shape as a whole, and includes an annular body portion 41. The body portion 41 is provided with a tank 42, a pump 43, sensors 49 and 50, a pressure adjustment portion 46, and a control portion 44. The oil supply unit 40 according to the present embodiment further includes a power source portion 45. The power source portion 45 supplies electric power for causing each of the pump 43, the sensors 49 and 50, the pressure adjustment portion 46, and the control portion 44 to function.

The body portion 41 is an annular member made of a resin, for example, and has a function as a frame that houses (holds) the pump 43 etc. That is, hollow spaces are formed in the body portion 41. The tank 42, the pump 43, the sensors 49 and 50, the pressure adjustment portion 46, the control portion 44, and the power source portion 45 are provided in the hollow spaces. Consequently, the oil supply unit 40 which includes the body portion 41, the tank 42, the pump 43, etc. is constituted integrally.

The tank 42 and the pump 43 are connected to each other through a flow path provided in piping 29. The tank 42 stores lubricating oil (oil) to be supplied to the pump 43 for replenishment. When lubricating oil is consumed with the pump 43 discharging lubricating oil, lubricating oil in the tank 42 automatically flows to the pump 43 for replenishment.

Figure 3:
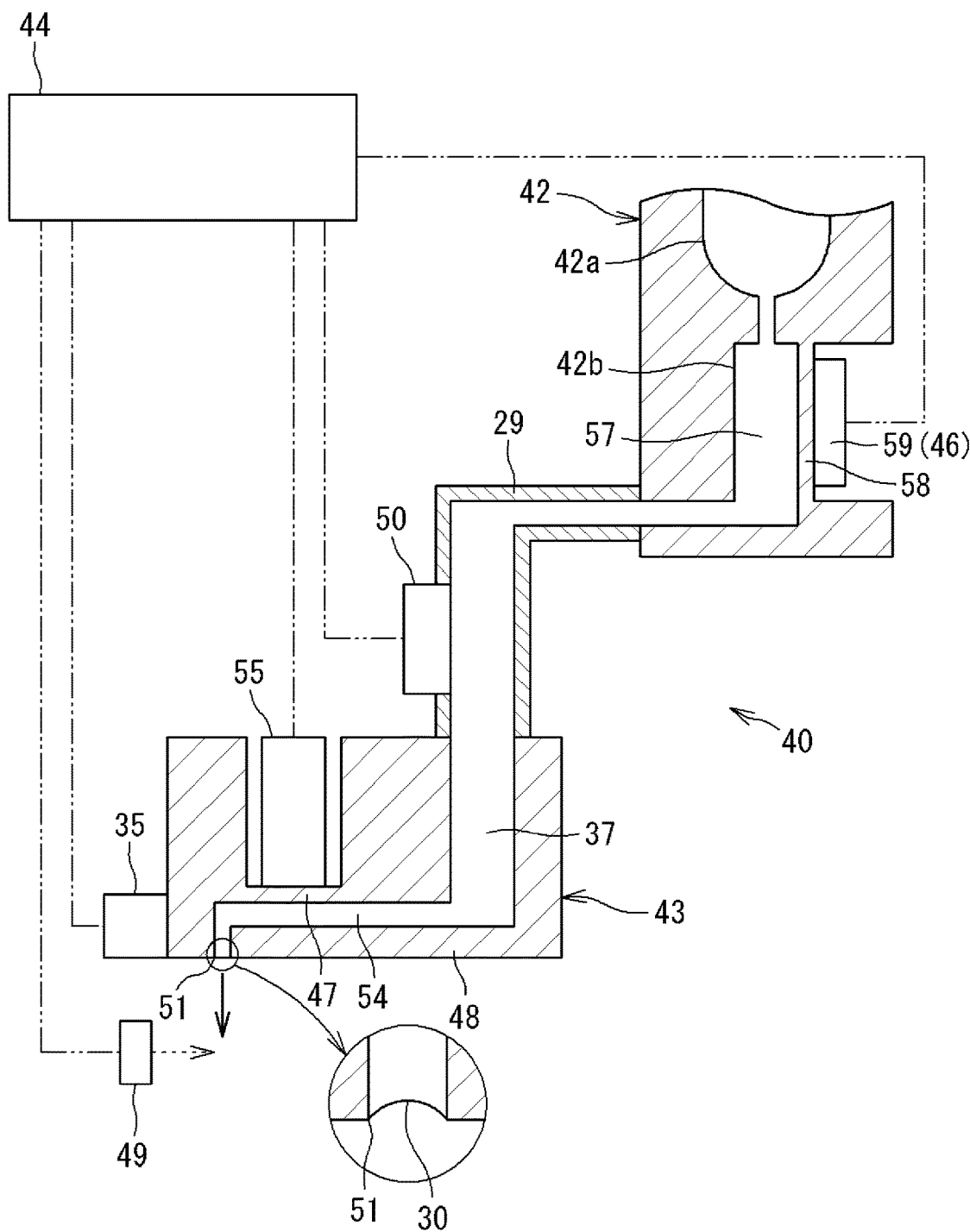
FIG. 3 schematically illustrates a pump, a part of a tank, and surrounding components.

The pump 43 has a function of supplying lubricating oil to the bearing portion 20 (annular space 11). In order to demonstrate this function, as illustrated in FIG. 3, the pump 43 has a pump body 48 provided with an ejection port (nozzle) 51 that ejects lubricating oil. The pump body 48 has a pressure chamber portion (first pressure chamber portion) 54 and a piezoelectric element (first piezoelectric element) 55. The pressure chamber portion 54 is a space that is connected to the ejection port 51 and that stores lubricating oil. FIG. 3 schematically illustrates the pump 43, a part of the tank 42, and surrounding components. An elastically deformable diaphragm (first diaphragm) 47 that constitutes a part of a wall of the first pressure chamber portion 54 is provided in the pump body 48. The first piezoelectric element 55 is attached to the first diaphragm 47. The first piezoelectric element 55 is deformed upon application of a voltage, and the first diaphragm 47 is deformed by deformation of the first piezoelectric element 55. Consequently, the volume of the first pressure chamber portion 54 is varied. The first pressure chamber portion 54 is filled with lubricating oil.

The ejection port 51 is constituted of a minute through hole formed in a wall portion of the pump body 48. The ejection port 51 opens in a side surface of the wall portion. The side surface in which the ejection port 51 opens faces a part of the annular space 11 (see FIG. 1).

As described above, the volume of the first pressure chamber portion 54 can be varied as the first piezoelectric element 55 is deformed by applying a voltage thereto. With the volume of the first pressure chamber portion 54 reduced, lubricating oil in the first pressure chamber portion 54 can be ejected from the ejection port 51 toward the annular space 11. In particular, when the first piezoelectric element 55 operates, lubricating oil is ejected from the ejection port 51 as oil droplets at an initial velocity. That is, oil droplets fly from the ejection port 51. The ejection port 51 opens toward the inner ring raceway 25 (see FIG. 1) of the bearing portion 20, and oil droplets ejected from the ejection port 51 can hit the balls 23, or hit the inner ring raceway 25 even if the oil droplets pass through a space between the balls 23, 23 which are adjacent to each other. Consequently, the oil supply unit 40 can supply oil to the bearing portion 20.

In this manner, the pump 43 is configured to receive lubricating oil from the tank 42 in the first pressure chamber portion 54, and to eject lubricating oil in the first pressure chamber portion 54 (cause lubricating oil in the first pressure chamber portion 54 to fly) from the ejection port 51 toward a target of the bearing portion 20 as oil droplets. From the viewpoint of efficient use of lubricating oil, the pump 43 ejects a determined amount of oil droplets in one ejection operation to cause the oil droplets to reach the target of the bearing portion 20. Several picoliters to several nanoliters of lubricating oil are ejected from the ejection port 51 as oil droplets in one operation of the pump 43. In the present embodiment, the target is the balls 23 and the inner ring raceway 25.

The amount of deformation operation of the first piezoelectric element 55 is changed by changing the value of a voltage applied to the first piezoelectric element 55 of the pump 43. That is, the amount of deformation operation of the first piezoelectric element 55 is increased by increasing the value of a voltage applied to the first piezoelectric element 55. As a result, the pressure (internal pressure) of lubricating oil in the first pressure chamber portion 54 is raised to increase the speed of ejection of lubricating oil from the ejection port 51. In contrast, the amount of deformation operation of the first piezoelectric element 55 is reduced by reducing the value of a voltage applied to the first piezoelectric element 55. As a result, the internal pressure of the first pressure chamber portion 54 is lowered to reduce the speed of ejection of lubricating oil from the ejection port 51. The internal pressure of the first pressure chamber portion 54 during operation of the first piezoelectric element 55 can be considered as the discharge pressure of the pump 43.

The pump 43 is connected to the tank 42 via the piping 29. Lubricating oil in the tank 42 is supplied to the pump 43 for replenishment through the piping 29. Therefore, the side of the tank 42 can be referred to as an "upstream side" in the direction of flow of lubricating oil, and the side of the ejection port 51 of the pump 43 can be referred to as a "downstream side". The tank 42 according to the present embodiment has a main tank portion 42a and a sub tank portion 42b. The main tank portion 42a is provided on the most upstream side on which much of lubricating oil for replenishment is stored. The sub tank portion 42b is provided on the downstream side of the main tank portion 42a. The sub tank portion 42b has a second pressure chamber portion 57 that can be filled with lubricating oil. The second pressure chamber portion 57 can be considered as an oil region which extends between the first pressure chamber portion 54 of the pump 43 and the tank 42 (main tank portion 42a) and in which lubricating oil is present. The second pressure chamber portion 57 is connected to the first pressure chamber portion 54 through the piping 29. When the internal pressure of the second pressure chamber portion 57 becomes higher, the internal pressure of the first pressure chamber portion 54 also becomes higher. When the internal pressure of the second pressure chamber portion 57 becomes lower, the internal pressure of the first pressure chamber portion 54 also becomes lower.

An elastically deformable diaphragm (second diaphragm) 58 that constitutes a part of a wall of the second pressure chamber portion 57 is provided in the sub tank portion 42b. A piezoelectric element (second piezoelectric element) 59 is attached to the second diaphragm 58. The second piezoelectric element 59 is deformed upon application of a voltage, and the second diaphragm 58 is deformed by deformation of the second piezoelectric element 59. Consequently, the volume of the second pressure chamber portion 57 is varied, and the pressure (internal pressure) of lubricating oil in the second pressure chamber portion 57 is adjusted. That is, in the present embodiment, the pressure adjustment portion 46 is constituted of a (second) pump that has the second piezoelectric element 59 which is deformable by application of a voltage.

When the second piezoelectric element 59 is deformed in the direction of reducing the volume of the second pressure chamber portion 57, the internal pressure of the second pressure chamber portion 57 becomes higher. When the second piezoelectric element 59 is deformed in the direction of increasing the volume of the second pressure chamber portion 57, in contrast, the internal pressure of the second pressure chamber portion 57 becomes lower. The volume of the second pressure chamber portion 57 can be changed so as to be reduced and increased in accordance with the magnitude of a voltage applied to the second piezoelectric element 59. Further, the volume of the second pressure chamber portion 57 can be maintained at a predetermined value by maintaining the voltage. From the above, the second piezoelectric element 59 which functions as the pressure adjustment portion 46 has a function of adjusting the pressure of lubricating oil in the second pressure chamber portion 57 (an oil region which extends from the first pressure chamber portion 54 to the tank 42 and in which lubricating oil is present).

In the present embodiment, the first piezoelectric element 55 of the pump 43 and the second piezoelectric element 59 which functions as the pressure adjustment portion 46 are of different types from each other. The first piezoelectric element 55 is a piezoelectric element (piezo element) of a longitudinal vibration type, while the second piezoelectric element 59 is a piezoelectric element (piezo element) of a flexural vibration type. The second piezoelectric element 59 is larger in operation amount than the first piezoelectric element 55. Specifically, the area in which the second piezoelectric element 59 presses the second diaphragm 58 between the second pressure chamber portion 57 and the second piezoelectric element 59 is larger than the area in which the first piezoelectric element 55 presses the first diaphragm 47 between the first pressure chamber portion 54 and the first piezoelectric element 55. In the case where the applied voltage is constant, the stroke in which the second piezoelectric element 59 presses the second diaphragm 58 is longer than the stroke in which the first piezoelectric element 55 presses the first diaphragm 47. Hence, the output of the second piezoelectric element 59 (pressure adjustment portion 46) for adjusting the pressure of lubricating oil in the second pressure chamber portion 57 which is an oil region is larger than the maximum output of the first piezoelectric element 55 for adjusting the pressure of lubricating oil in the first pressure chamber portion 54.

The oil supply unit 40 according to the present embodiment has a first sensor and a second sensor. The first sensor is a sensor that detects a phenomenon due to the lubrication state of the bearing portion 20. Specifically, the first sensor is a temperature sensor (infrared sensor) 49, preferably of a non-contact type. The temperature sensor 49 is attached to a part of the body portion 41 of the oil supply unit 40 (see FIG. 2). For example, when the bearing portion 20 is brought into a poor lubrication state, the temperature of the bearing portion 20 is raised. Thus, the temperature sensor 49 detects the temperature of a part (e.g. the cage 24) of the bearing portion 20. Variations in temperature of the bearing portion 20 can be considered as variations in state (lubrication state) of the bearing portion 20. Thus, the temperature sensor 49 detects a phenomenon due to the state (lubrication state) of the bearing portion 20.

The first sensor may be different from the temperature sensor 49, and may be a vibration sensor or an acoustic emission (AE) sensor. The first sensor may be a combination of a plurality of such sensors. For example, when the bearing portion 20 is brought into a poor lubrication state, vibration of the bearing portion 20 may be increased, or an elastic wave (sound wave) may be radiated with unexpected strain energy accumulated. In the case where the first sensor is a vibration sensor, the first sensor can detect vibration generated at the bearing portion 20 through the outer ring spacer 18. In the case where the first sensor is an AE sensor, the first sensor detects an elastic wave as a sound wave when strain energy inside the bearing portion 20 (e.g. the outer ring 22) is radiated as an elastic wave.

The second sensor is a pressure sensor (minute pressure sensor) 50 (see FIG. 3), and detects the pressure of lubricating oil in an oil region which extends from the first pressure chamber portion 54 of the pump 43 to the tank 42 and in which lubricating oil is present. The oil region according to the present embodiment is the piping 29 between the pump 43 and the tank 42, and the pressure (internal pressure) of lubricating oil in the piping 29 is detected by the pressure sensor 50.

The detection results from the temperature sensor 49 which serves as the first sensor and the pressure sensor 50 which serves as the second sensor are output to the control portion 44. The control portion 44 is constituted of a circuit substrate that includes a programmed microcomputer etc., and can execute various processes. The function of the control portion 44 will be described. The control portion 44 can determine whether or not the lubrication state of the bearing portion 20 is appropriate by comparing the detection value from the temperature sensor 49 and a prescribed threshold (determination process). The control portion 44 can compare the pressure which is detected by the pressure sensor 50 and a prescribed reference pressure to calculate the difference between the detected pressure and the reference pressure (comparison process). The control portion 44 can select and execute a first process, a second process, a third process, and a fourth process to be described below in accordance with the processing results of the determination process and the comparison process.

First process: to perform control so as to change the amount of deformation operation of the first piezoelectric element 55 in the case where the difference between the pressure which is detected by the pressure sensor 50 and the reference pressure is equal to or less than a threshold.

Second process: to perform control so as to lower the pressure of lubricating oil in the second pressure chamber portion 57 using the second piezoelectric element 59 in the case where the pressure which is detected by the pressure sensor 50 is higher than the reference pressure and the difference (absolute value) between the detected pressure and the reference pressure is more than the threshold.

Third process: to perform control so as to raise the pressure of lubricating oil in the second pressure chamber portion 57 using the second piezoelectric element 59 in the case where the pressure which is detected by the pressure sensor 50 is lower than the reference pressure and the difference (absolute value) between the detected pressure and the reference pressure is more than the threshold.

Fourth process: to perform control so as to raise the pressure of lubricating oil in the second pressure chamber portion 57 using the second piezoelectric element 59 in the case where it is determined on the basis of the detection result from the temperature sensor 49 that the lubrication state of the bearing portion 20 is not appropriate.

Regarding the first process, control for changing the amount of deformation operation of the first piezoelectric element 55 is achieved through control for changing a voltage applied to the first piezoelectric element 55. The pressure of lubricating oil in the second pressure chamber portion 57 becomes higher (or lower) through the second, third, and fourth processes. Consequently, lubricating oil in the first pressure chamber portion 54 which is connected to the second pressure chamber portion 57 is pressurized (or depressurized).

In this manner, the control portion 44 has a function of controlling at least one of operation to adjust the pressure of lubricating oil in the second pressure chamber portion 57 using the second piezoelectric element 59 and deformation operation of the first piezoelectric element 55 on the basis of the results of detection performed by the temperature sensor 49 and the pressure sensor 50. The control portion 44 also has a function of controlling the timing to eject lubricating oil from the ejection port 51 of the pump 43, that is, the timing to deform the first piezoelectric element 55. A specific example of a process executed by the control portion 44 will be described below.

Control performed by the control portion 44 with the pump 43 standing by to eject lubricating oil during normal operation of the oil supply unit 40 will be described. With the pump 43 standing by, as illustrated in an enlarged view of the ejection port 51 in FIG. 3, a meniscus 30 of lubricating oil is formed at the downstream end of the ejection port 51. This is because the pressure (internal pressure) of lubricating oil at the ejection port 51 is slightly negative with reference to the outside (atmospheric pressure) of the pump 43. In the present embodiment, during normal times, the control portion 44 controls the second piezoelectric element 59, which functions as the pressure adjustment portion 46, such that the pressure (internal pressure: Pnoz) of lubricating oil at the ejection port 51 and the pressure (internal pressure: Ptank) of lubricating oil in the second pressure chamber portion 57 are constant.

It is considered that lubricating oil stored in the tank 42 is consumed (decreased) by oil supply operation by the pump 43, and that the internal pressure (Ptank) of the second pressure chamber portion 57 is fluctuated by the remaining amount of lubricating oil in the tank 42. The internal pressure (Pnoz) of the ejection port 51 is determined by the form (size) thereof. Therefore, operation of the second piezoelectric element 59 is controlled by the control portion 44 such that the internal pressure (Pnoz), which serves as the reference pressure, and the internal pressure (Ptank) of the second pressure chamber portion 57 are equal to each other. In this manner, by making the internal pressure (Pnoz) of the ejection port 51 and the internal pressure (Ptank) of the second pressure chamber portion 57 equal to each other, lubricating oil can be ejected from the ejection port 51 at a desired constant ejection speed (ejection amount) when the first piezoelectric element 55 of the pump 43 performs constant operation, that is, a constant voltage (a voltage with a predetermined waveform) is applied to the first piezoelectric element 55. When the state of balance in which the internal pressure (Pnoz) of the ejection port 51 and the internal pressure (Ptank) of the second pressure chamber portion 57 are equal to each other is lost, the control portion 44 selects and executes one of the first process, the second process, and the third process in accordance with the state as described below.

As described above, the internal pressure (Ptank) of the second pressure chamber portion 57 is occasionally fluctuated in accordance with the remaining amount of lubricating oil in the tank 42. When the internal pressure (Ptank) is fluctuated, a pressure difference is generated between the internal pressure (Pnoz) of the ejection port 51, which serves as the reference pressure, and the internal pressure (Ptank). When the internal pressure (Ptank) of the second pressure chamber portion 57 becomes higher than the internal pressure (Pnoz) of the ejection port 51, the internal pressure of the first pressure chamber portion 54, that is, the discharge pressure of the pump 43, also becomes higher. Therefore, the discharge pressure becomes higher, and thus the discharge speed of lubricating oil becomes higher, even if the first piezoelectric element 55 performs constant operation. When the internal pressure (Ptank) of the second pressure chamber portion 57 becomes lower than the internal pressure (Pnoz)

of the ejection port 51, in contrast, the internal pressure of the first pressure chamber portion 54, that is, the discharge pressure of the pump 43, also becomes lower. Therefore, the discharge pressure becomes lower, and thus the discharge speed of lubricating oil becomes lower, even if the first piezoelectric element 55 performs constant operation. In this manner, oil supply by the pump 43 occasionally becomes unstable when operation of the oil supply unit 40 is continued.

Thus, the pressure sensor 50 detects the pressure (internal pressure) of lubricating oil in the piping 29 which is (generally) equal to the internal pressure (Ptank) of the second pressure chamber portion 57. In the case where an absolute value ΔP of the difference between a detected pressure (P'tank) in the piping 29 and the reference pressure (Pnoz) which is set in advance is equal to or less than a first threshold Q1 and equal to or more than a second threshold Q2 (wherein Q1>Q2), the control portion 44 performs control so as to change the amount of deformation operation of the first piezoelectric element 55.

Specifically, in the case where the absolute value ΔP of the difference is equal to or less than the first threshold Q1 and equal to or more than Q2 (Q2≤ΔP≤Q1) and the detected pressure (P'tank) is higher than the reference pressure (Pnoz), the control portion 44 performs control so as to apply a voltage that is lower than that before detection of the pressure to the first piezoelectric element 55 as an instruction signal for the first piezoelectric element 55. In the case where the absolute value ΔP is equal to or less than the first threshold Q1 and equal to or more than Q2 but the detected pressure (P'tank) is lower than the reference pressure (Pnoz), in contrast to the above case, the control portion 44 performs control so as to apply a voltage that is higher than that before detection of the pressure to the first piezoelectric element 55 as an instruction signal for the first piezoelectric element 55. In this manner, control for lowering or raising the voltage to be applied is executed in accordance with the magnitude of the detected pressure (P'tank). That is, control based on the detected pressure (P'tank) is feedback control.

As described above, in the case where the difference ΔP between the pressure (P'tank) which is detected by the pressure sensor 50 and the reference pressure (Pnoz) is equal to or less than the first threshold Q1 (and equal to or more than the second threshold Q2), the control portion 44 performs control so as to change the amount of deformation operation of the first piezoelectric element 55 as the first process. With the first process, the pressure sensor 50 detects the internal pressure (P'tank) of the piping 29 which is (generally) equal to the pressure in the second pressure chamber portion 57, and varies the amount of deformation operation of the first piezoelectric element 55 in accordance with the detection result, even if oil supply by the pump 43 becomes unstable with the pressure of lubricating oil in the second pressure chamber portion 57 fluctuated, for example. As a result, a state as close as possible to the state of balance described above can be reached, which makes it possible to stabilize ejection of lubricating oil by the pump 43.

In the case where the difference ΔP between the detected pressure (P'tank) and the reference pressure (Pnoz) is less than the second threshold Q2 (ΔP<Q2), the speed of ejection of lubricating oil by the pump 43 is not varied significantly. Consequently, it is possible not to change the amount of deformation operation of the first piezoelectric element 55.

The first process is performed in the case where the absolute value ΔP of the difference between the internal pressure (P'tank) of the piping 29, which is (generally) equal to the pressure (Ptank) in the second pressure chamber portion 57, and the reference pressure (Pnoz) is equal to or less than the first threshold Q1. A case where the absolute value ΔP of the difference is more than the first threshold Q1, that is, a case where the pressure (Ptank=P'tank) in the second pressure chamber portion 57 is fluctuated significantly, will be described below.

First, a case where the absolute value ΔP of the difference between the detected pressure (P'tank) and the reference pressure (Pnoz) is more than the first threshold Q1 (ΔP>Q1) and the detected pressure (P'tank) is higher than the reference pressure (Pnoz) will be described. In this case, lubricating oil may be pushed out to arbitrarily seep from the ejection port 51 of the pump 43, even if the first piezoelectric element 55 is not deformed, with a pressure that has become higher in the second pressure chamber portion 57 and the piping 29 transmitted to the first pressure chamber portion 54 of the pump 43.

Thus, in such a case, the control portion 44 performs control so as to apply a voltage that deforms the second piezoelectric element 59 in the direction of increasing the volume of the second pressure chamber portion 57 as an instruction signal for the second piezoelectric element 59. Consequently, the pressure (Ptank) in the second pressure chamber portion 57 can be lowered compared to that at the time of detection of the pressure to become close to the reference pressure (Pnoz). In this manner, in the case where the pressure (P'tank) which is detected by the pressure sensor 50 is higher than the reference pressure (Pnoz) and the difference ΔP between the detected pressure (P'tank) and the reference pressure (Pnoz) is more than the first threshold Q1, the control portion 44 performs control so as to lower the pressure of lubricating oil in the second pressure chamber portion 57 using the second piezoelectric element 59 as the second process. With the second process, the internal pressure of the first pressure chamber portion 54 which is connected to the second pressure chamber portion 57 is lowered by lowering the pressure (Ptank) in the second pressure chamber portion 57 using the second piezoelectric element 59, even if the pressure (Ptank) has become high. Consequently, it is possible to prevent lubricating oil from arbitrarily seeping from the pump 43. In particular, the pressure in the second pressure chamber portion 57 is preferably lowered by the second piezoelectric element 59 such that the pressure in the piping 29 which is (generally) equal to the pressure in the second pressure chamber portion 57, that is, the pressure (Ptank) which is detected by the pressure sensor 50, becomes equal to the reference pressure (Pnoz).

Next, a case where the absolute value ΔP of the difference between the detected pressure (P'tank) and the reference pressure (Pnoz) is more than the first threshold Q1 (ΔP>Q1) and the detected pressure (P'tank) is lower than the reference pressure (Pnoz) will be described. In this case, lubricating oil may not be ejected as oil droplets with a desired discharge pressure not obtained in the first pressure chamber portion 54, even if the first piezoelectric element 55 is deformed, as a pressure that has become lower in the second pressure chamber portion 57 and the piping 29 is transmitted to the first pressure chamber portion 54 of the pump 43.

Thus, in such a case, the control portion 44 performs control so as to apply a voltage that deforms the second piezoelectric element 59 in the direction of reducing the volume of the second pressure chamber portion 57 as an instruction signal for the second piezoelectric element 59. Consequently, the pressure (Ptank) in the second pressure chamber portion 57 can be raised compared to that at the time of detection of the pressure to become close to the reference pressure (Pnoz). In this manner, in the case where the pressure (P'tank) which is detected by the pressure sensor 50 is lower than the reference pressure (Pnoz) and the absolute value ΔP of the difference between the detected pressure (P'tank) and the reference pressure (Pnoz) is more than the first threshold Q1, the control portion 44 performs control so as to raise the pressure of lubricating oil in the second pressure chamber portion 57 using the second piezoelectric element 59 as the third process. With the third process, the pressure (Ptank) in the second pressure chamber portion 57 is raised by the second piezoelectric element 59, even if the pressure (Ptank) has been lowered. Consequently, the internal pressure of the first pressure chamber portion 54 which is connected to the second pressure chamber portion 57 is raised, and thus a desired discharge pressure can be obtained in the first pressure chamber portion 54, which makes it possible to stably eject lubricating oil from the pump 43. In particular, the pressure in the second pressure chamber portion 57 is preferably raised by the second piezoelectric element 59 such that the pressure (Ptank) in the piping 29 which is (generally) equal to the pressure in the second pressure chamber portion 57 becomes equal to the reference pressure (Pnoz).

As in the second process and the third process, control for lowering or raising the internal pressure of the second pressure chamber portion 57 is executed in accordance with the magnitude of the detected pressure (P'tank). That is, control based on the detected pressure (P'tank) is feedback control. The first threshold Q1 which is adopted in the second process may be different from that adopted in the third process.

Unlike the first, second, and third processes, the fourth process is performed to resolve unstable oil supply due to intrusion of foreign matter such as air into the first pressure chamber portion 54 of the pump 43.

As described above, the pump 43 ejects lubricating oil from the ejection port 51 as minute oil droplets. When lubricating oil is ejected from the ejection port 51 which is a minute hole, a large part of the lubricating oil is directed toward the target, but a part of the lubricating oil is returned toward the pump body 48 because of viscosity. In this event, outside air is occasionally drawn in through the ejection port 51 together with the part of lubricating oil to enter the first pressure chamber portion 54. Air may also enter the first pressure chamber portion 54 from the tank 42 side. In this manner, when foreign matter such as air intrudes into the first pressure chamber portion 54, a malfunction in which oil supply by the pump 43 is unstable may be caused with a desired discharge pressure not obtained since the air functions as a damper, even if the first piezoelectric element 55 operates. In this case, the lubrication state of the bearing portion 20 is degraded soon by a shortage of lubricating oil, which raises the temperature.

Thus, the temperature sensor 49 detects the temperature of the bearing portion 20, and the control portion 44 detects a temperature rise as variations in state of the bearing portion 20. When the control portion 44 compares a detection value from the temperature sensor 49 and a temperature threshold and determines that the detection value is more than the threshold, it is considered that air has intruded, and control for raising the internal pressure of the second pressure chamber portion 57 using the second piezoelectric element 59 is performed. In this manner, when it is determined that the lubrication state of the bearing portion 20 is not appropriate, control for raising the internal pressure of the second pressure chamber portion 57 using the second piezoelectric element 59 is performed to pressurize lubricating oil in the first pressure chamber portion 54 which is connected to the second pressure chamber portion 57.

This control will be further described specifically. When it is considered that air has intruded into the first pressure chamber portion 54 as determined by the control portion 44, the control portion 44 performs control so as to apply a voltage that deforms the second piezoelectric element 59 in the direction of reducing the volume of the second pressure chamber portion 57 as an instruction signal for the second piezoelectric element 59. Consequently, the pressure of lubricating oil in the second pressure chamber portion 57 is raised, and the internal pressure of the first pressure chamber portion 54 which is connected to the second pressure chamber portion 57 is raised, which allows forcibly discharging (pushing out) air that has intruded into the first pressure chamber portion 54. As a result, it is possible to resolve a malfunction in oil supply.

With the fourth process described above, lubricating oil containing air is occasionally discharged to seep from the ejection port 51. Thus, in order that discharged lubricating oil does not cover the ejection port 51, the pump 43 according to the present embodiment further has a vibration element 35 that vibrates the pump body 48. The vibration element 35 is constituted of a vibration actuator that operates upon receiving an instruction signal from the control portion 44, and operates upon receiving electric power from the power source portion 45. In the present embodiment, the vibration element 35 is caused to operate after the fourth process. The vibration element 35 has a piezoelectric element, for example, and vibrates the pump body 48 through vibration of the piezoelectric element. With the vibration element 35, even if lubricating oil adheres to the opening of the ejection port 51 or the vicinity of the opening to block the opening of the ejection port 51, the lubricating oil can be removed by separating the lubricating oil or moving the lubricating oil away from the opening of the ejection port 51 with the vibration element 35 vibrating the pump body 48. Consequently, it is possible to eject lubricating oil from the ejection port 51. As illustrated in FIG. 3, the vibration element 35 is provided outside the pump body 48. However, the vibration element 35 may be configured to be incorporated inside the pump body 48. The vibration application source (vibration actuator) of the vibration element 35 may not be a piezoelectric element. The first piezoelectric element 55 may be used also as the vibration application source of the vibration element 35.

The control portion 44 selectively executes one of the first process, the second process, and the third process in accordance with the detection result from the pressure sensor 50. However, the control portion 44 may execute both one of the first process, the second process, and the third process and the fourth process in the same time period.

With the bearing device 10 according to the present embodiment, as described above, in the case where oil supply by the pump 43 is unstable, the pressure sensor 50 detects the pressure of lubricating oil in the second pressure chamber portion 57, which is considered to be one cause of such unstable oil supply. In the case where ejection of lubricating oil from the pump 43 is poor, the temperature sensor 49 detects the state (a sign of a shortage of lubricating oil) of the bearing portion 20. At least one of adjustment operation (second process, third process, or fourth process) by the second piezoelectric element 59, which functions as the pressure adjustment portion 46, and deformation operation (first process) of the first piezoelectric element 55 of the pump 43 is controlled on the basis of the results of detection performed by the pressure sensor 50 and the temperature sensor 49.

Through control of the adjustment operation, the pressure in the second pressure chamber portion 57 can be adjusted to cause the pressure in the first pressure chamber portion 54, which is connected to the second pressure chamber portion 57, to become close to a desired value (discharge pressure) (second process and third process), or the second pressure chamber portion 57 can be pressurized to discharge foreign matter such as air in the first pressure chamber portion 54, which is connected to the second pressure chamber portion 57 (fourth process). Through control of the deformation operation (first process), a voltage applied to the first piezoelectric element 55 can be varied to adjust the ejection capability of the pump 43. As a result, it is possible to resolve unstable oil supply by the pump 43.

In particular, in the present embodiment, as described above, the first piezoelectric element 55 and the second piezoelectric element 59 are of different types from each other. Consequently, the output for a case where the second piezoelectric element 59 pressurizes lubricating oil in the second pressure chamber portion 57 is larger than the output (maximum output) for a case where the first piezoelectric element 55 pressurizes lubricating oil in the first pressure chamber portion 54. Therefore, even if a malfunction of the oil supply unit 40 caused by unstable oil supply by the pump 43 cannot be handled with the output (ejection capability) of the first piezoelectric element 55, such a malfunction can be resolved by the function (second process, third process, and fourth process) of the second piezoelectric element 59

The pressure sensor 50 may detect the pressure of lubricating oil in an oil region which extends from the first pressure chamber portion 54 to the tank 42 and in which lubricating oil is present. In the embodiment described above, the pressure sensor 50 detects the internal pressure of the piping 29 between the first pressure chamber portion 54 and the tank 42. However, the pressure sensor 50 may detect a pressure in an oil region other than the piping 29. For example, as illustrated in FIG. 4, the pressure sensor 50 may be configured to detect the pressure (internal pressure) of lubricating oil in the second pressure chamber portion 57.

Figure 5:
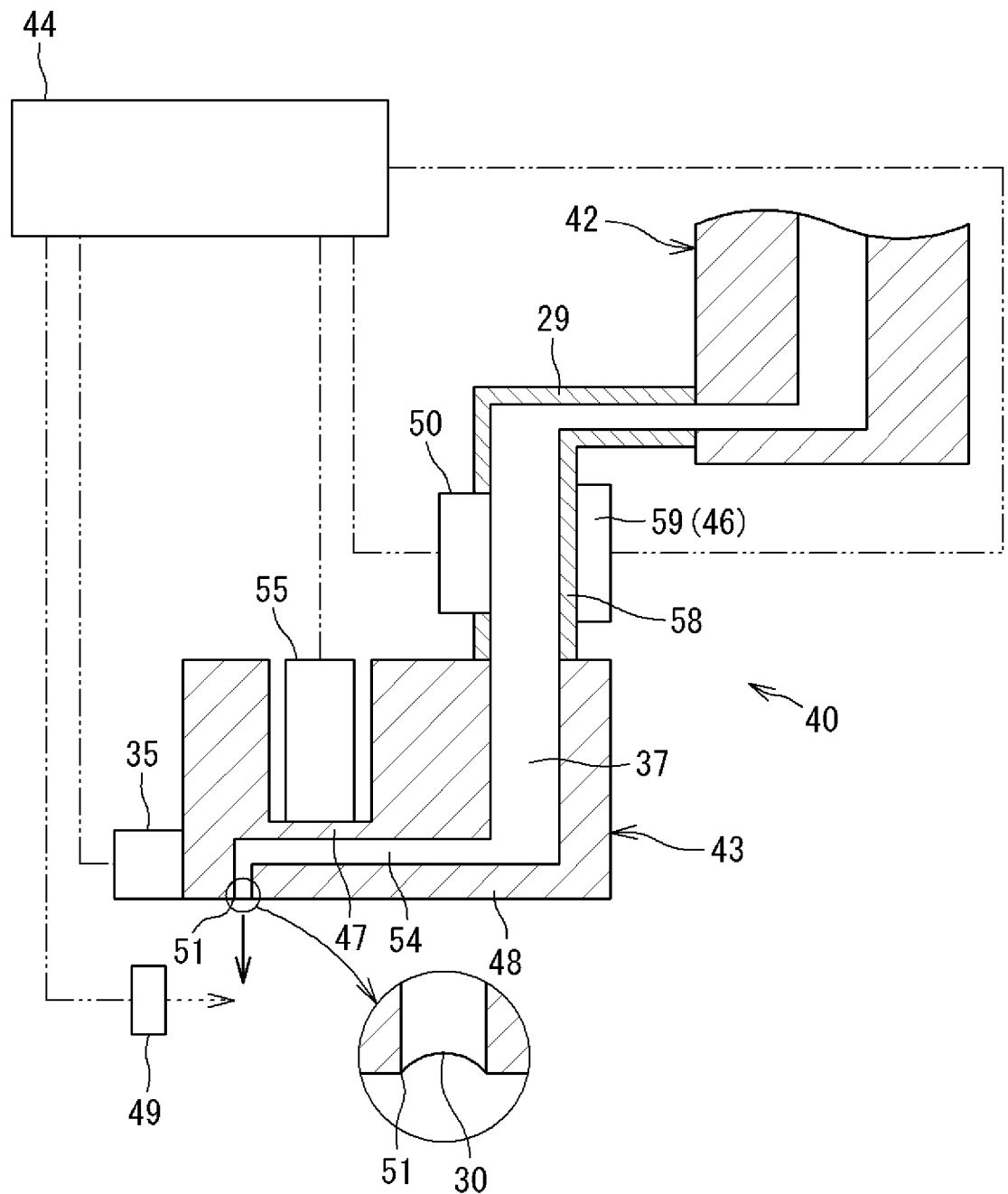
FIG. 5 schematically illustrates a pump, a part of a tank, and surrounding components (according to a different embodiment)
Figure 6:
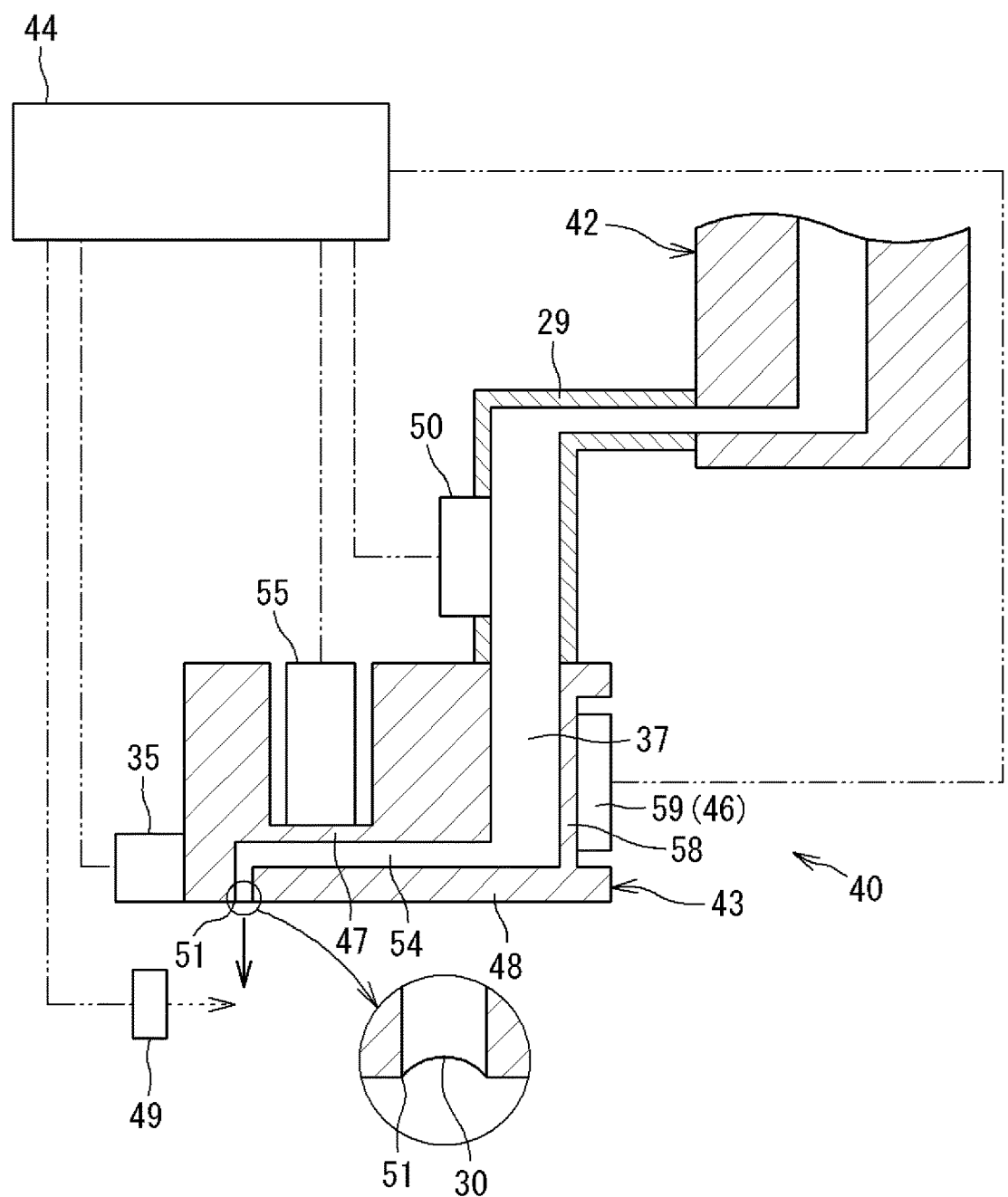
FIG. 6 schematically illustrates a pump, a part of a tank, and surrounding components (according to a different embodiment).

In the embodiment described above (see FIG. 3), the second pressure chamber portion 57 is provided on the tank 42 side, and the internal pressure of the second pressure chamber portion 57 is adjusted by the pressure adjustment portion 46 (second piezoelectric element 59). However, the pressure adjustment portion 46 may be configured to adjust the pressure of lubricating oil in a different oil region that extends from the first pressure chamber portion 54 to the tank 42. For example, as illustrated in FIG. 5, the pressure adjustment portion 46 (second piezoelectric element 59) may be provided in the piping 29 to adjust the pressure of lubricating oil in the piping 29. As a modification to such an example, as illustrated in FIG. 6, the pressure adjustment portion 46 (second piezoelectric element 59) may be configured to adjust the pressure of lubricating oil in an oil region in the pump 43. That is, the pressure adjustment portion 46 (second piezoelectric element 59) may be configured to adjust the pressure of lubricating oil in a flow path 37 on the upstream side of the first pressure chamber portion 54 in the pump 43.

Figure 4:
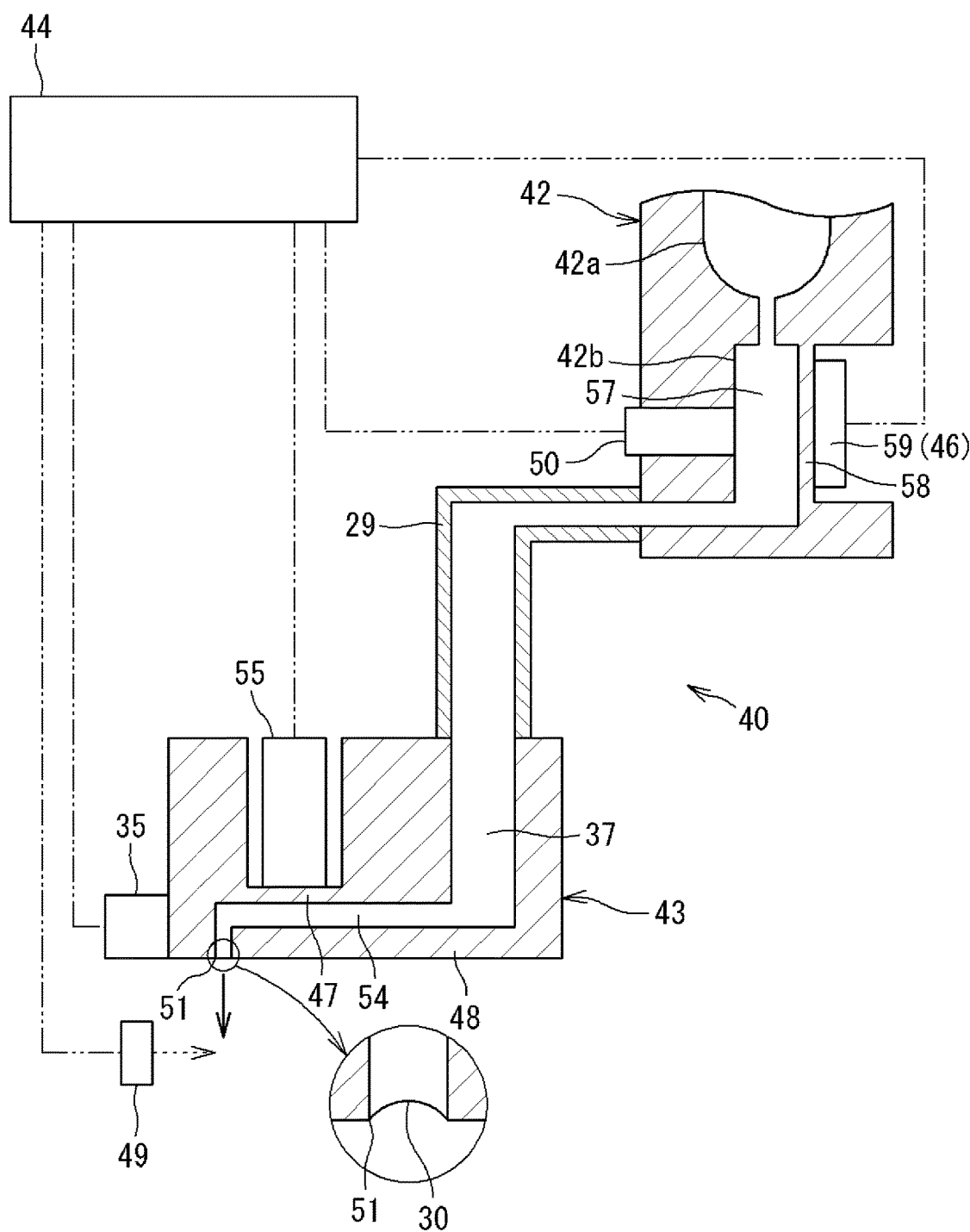
FIG. 4 schematically illustrates a pump, a part of a tank, and surrounding components (according to a different embodiment)

As indicated in each of the embodiments, the oil region as the subject of pressure detection by the pressure sensor 50 and the oil region as the subject of internal pressure adjustment by the pressure adjustment portion 46 may be the same as each other (as illustrated in FIGS. 4 and 5), and may be different from each other (as illustrated in FIGS. 3 and 6). The oil region as the subject of pressure detection by the pressure sensor 50 may be the pump 43 (flow path 37 on the upstream side), besides an intermediate portion (e.g. the piping 29; see FIG. 3) between the first pressure chamber portion 54 and the tank 42 and the tank 42 (second pressure chamber portion 57; see FIG. 4). Further, although not illustrated, the oil region as the subject of pressure detection by the pressure sensor 50 and the oil region as the subject of internal pressure adjustment by the pressure adjustment portion 46 may each be the intermediate portion (piping 29), the first pressure chamber portion 54, or a region which is branched from the tank 42 and in which lubricating oil is present.

In the embodiment described above (see FIG. 3), an oil region which extends from the first pressure chamber portion 54 to the tank 42 and in which lubricating oil is present is described as the second pressure chamber portion 57, and the pressure adjustment portion 46 which has a function of adjusting the pressure of lubricating oil in the oil region (second pressure chamber portion 57) is constituted of the second piezoelectric element 59. The pressure adjustment portion 46 which has the function described above may be a component other than a piezoelectric element, and may be constituted of a different actuator (e.g. having a small motor as a power source).

The embodiments disclosed above are exemplary in all respects, and are not limiting. That is, the rolling bearing device and the oil supply unit according to the present invention are not limited to the illustrated embodiments, and may be in other embodiments without departing from the scope of the present invention. For example, the bearing portion 20 illustrated in FIG. 1 is an angular contact ball bearing. However, the type of the bearing is not limited thereto, and may be a deep-groove ball bearing. In addition, the bearing portion 20 may be a tapered roller bearing, a cylindrical roller bearing, or the like that has rollers as the rolling elements.

In the embodiment described above (see FIG. 1), the oil supply unit 40 is integrated with the bearing portion 20, and supplies oil to the bearing portion 20. However, the oil supply unit 40 may be provided together with a different rotary portion (e.g. a gear mechanism) to supply oil to such a rotary portion.

According to the present invention, it is possible to resolve a state in which oil supply by a pump is unstable.

What is claimed is:
1. A rolling bearing device comprising:
 a bearing portion that has an inner ring, an outer ring, and a plurality of rolling elements provided between the inner ring and the outer ring; and
 an oil supply unit provided adjacent to the bearing portion and configured to supply lubricating oil to the bearing portion, wherein
 the oil supply unit has:
  a pump that has a pressure chamber portion that stores lubricating oil and a piezoelectric element that is deformable by application of a voltage to vary a volume of the pressure chamber portion, the pump ejecting lubricating oil in the pressure chamber portion as the volume is reduced;
  a tank that is connected to the pump and that stores lubricating oil to be supplied to the pump for replenishment;

a sensor that detects a pressure in an oil region which extends from the pressure chamber portion to the tank and in which lubricating oil is present, or a state of the bearing portion;

a pressure adjustment portion that selectively adjusts a pressure of lubricating oil in the oil region which extends from the pressure chamber portion to the tank and in which lubricating oil is present; and a control portion that controls at least one of the pressure adjustment portion and the piezoelectric element on the basis of a detection result from the sensor.

2. The rolling bearing device according to claim 1, wherein:

the sensor detects a phenomenon due to a lubrication state of the bearing portion; and the control portion performs control so as to increase the pressure of lubricating oil in the oil region using the pressure adjustment portion when it is determined on the basis of a detection result from the sensor that the lubrication state is not appropriate.

3. The rolling bearing device according to claim 1, wherein:

the sensor detects the pressure in the oil region; and the control portion performs control so as to change an amount of deformation operation of the piezoelectric element in a case where a difference between the pressure which is detected by the sensor and a reference pressure is equal to or less than a threshold.

4. The rolling bearing device according to claim 1, wherein:

the sensor detects the pressure in the oil region; and the control portion performs control so as to lower the pressure of lubricating oil in the oil region using the pressure adjustment portion in a case where the pressure which is detected by the sensor is higher than a reference pressure and a difference between the detected pressure and the reference pressure is more than a threshold.

5. The rolling bearing device according to claim 1, wherein:

the sensor detects the pressure in the oil region; and the control portion performs control so as to raise the pressure of lubricating oil in the oil region using the pressure adjustment portion in a case where the pressure which is detected by the sensor is lower than a reference pressure and a difference between the detected pressure and the reference pressure is more than a threshold.

6. The rolling bearing device according to claim 1, wherein an output of the pressure adjustment portion for adjusting the pressure of lubricating oil in the oil region is larger than a maximum output of the piezoelectric element for adjusting the pressure of lubricating oil in the pressure chamber portion.

7. The rolling bearing device according to claim 6, wherein:

the sensor detects a phenomenon due to a lubrication state of the bearing portion; and the control portion performs control so as to increase the pressure of lubricating oil in the oil region using the pressure adjustment portion when it is determined on the basis of a detection result from the sensor that the lubrication state is not appropriate.

8. The rolling bearing device according to claim 6, wherein:

the sensor detects the pressure in the oil region; and the control portion performs control so as to change an amount of deformation operation of the piezoelectric element in a case where a difference between the pressure which is detected by the sensor and a reference pressure is equal to or less than a threshold.

9. The rolling bearing device according to claim 6, wherein:

the sensor detects the pressure in the oil region; and the control portion performs control so as to lower the pressure of lubricating oil in the oil region using the pressure adjustment portion in a case where the pressure which is detected by the sensor is higher than a reference pressure and a difference between the detected pressure and the reference pressure is more than a threshold.

10. The rolling bearing device according to claim 6, wherein:

the sensor detects the pressure in the oil region; and the control portion performs control so as to raise the pressure of lubricating oil in the oil region using the pressure adjustment portion in a case where the pressure which is detected by the sensor is lower than a reference pressure and a difference between the detected pressure and the reference pressure is more than a threshold.

11. An oil supply unit that supplies oil to a rotary portion, the oil supply unit comprising:

a pump that has a pressure chamber portion that stores lubricating oil and a piezoelectric element that is deformable by application of a voltage to vary a volume of the pressure chamber portion, the pump ejecting lubricating oil in the pressure chamber portion as the volume is reduced;

a tank that is connected to the pump and that stores lubricating oil to be supplied to the pump for replenishment;

a sensor that detects a pressure in an oil region which extends from the pressure chamber portion to the tank and in which lubricating oil is present, or a state of the rotary portion;

a pressure adjustment portion that selectively adjusts a pressure of lubricating oil in the oil region which extends from the pressure chamber portion to the tank and in which lubricating oil is present; and a control portion that controls at least one of the pressure adjustment portion and the piezoelectric element on the basis of a detection result from the sensor.

* * * * *